United States Patent
Han et al.

(10) Patent No.: US 9,792,540 B2
(45) Date of Patent: Oct. 17, 2017

(54) LIMITER CIRCUIT CAPABLE OF CONTINUOUSLY ADJUSTING AMPLITUDE OF RECTIFIED SIGNAL AND PASSIVE RADIO FREQUENCY TAG

(71) Applicants: Excelio Technology (Shenzhen) Co., Ltd., Shenzhen (CN); Wuxi Excelio Technology CO., Ltd., Wuxi (CN)

(72) Inventors: Fuqiang Han, Shenzhen (CN); Patrick Bian Wu, Shenzhen (CN)

( * ) Notice: Subject to any disclaimer, the term of this patent is extended or adjusted under 35 U.S.C. 154(b) by 0 days.

(21) Appl. No.: 15/202,554

(22) Filed: Jul. 5, 2016

(65) Prior Publication Data

US 2016/0314389 A1    Oct. 27, 2016

Related U.S. Application Data

(63) Continuation of application No. PCT/CN2015/070140, filed on Jan. 6, 2015.

(30) Foreign Application Priority Data

Jan. 8, 2014    (CN) .......................... 2014 1 0008854

(51) Int. Cl.
| | |
|---|---|
| *G06K 19/06* | (2006.01) |
| *G06K 19/07* | (2006.01) |
| *G06K 7/00* | (2006.01) |

(52) U.S. Cl.
CPC ....... *G06K 19/0709* (2013.01); *G06K 7/0008* (2013.01); *G06K 19/0701* (2013.01)

(58) Field of Classification Search
CPC ............. G06K 19/0709; G06K 7/1008; G06K 19/0701; G06K 19/07749; B42D 15/10; G07F 7/1008; G06Q 20/341

(Continued)

(56) References Cited

U.S. PATENT DOCUMENTS

| | | | | |
|---|---|---|---|---|
| 2004/0256467 | A1* | 12/2004 | Clemens ................. | H01L 27/28 235/492 |
| 2005/0133605 | A1* | 6/2005 | Koyama ............ | G06K 19/0713 235/492 |
| 2012/0168520 | A1* | 7/2012 | Finocchiaro ............. | H04B 5/00 235/492 |

* cited by examiner

*Primary Examiner* — Karl D Frech
(74) *Attorney, Agent, or Firm* — Wayne & Ken, LLC; Tony Hom

(57) ABSTRACT

In the present invention, by connecting a band-gap reference voltage module unit to a threshold unit of a limiter circuit, the ON-voltage of the threshold unit can be dynamically and continuously controlled; and the output voltage value of the band-gap reference voltage module unit can be arbitrarily set as needed for operating the circuit. When a voltage of the antenna terminal is higher than the sum of this band-gap reference voltage value and the respective threshold voltage of the serial MOS transistors, the threshold unit is turned ON to switch on a grounded path, so that charge at the antenna is output to the ground; in this way, the amount of charge at the antenna terminal is reduced and the rectified DC voltage is thus reduced. When the voltage at the antenna terminal is lower than the sum of this band-gap reference voltage value and the respective threshold voltage of the serial MOS transistors, the threshold unit is turned off to switch off the grounded path. The rectifier circuit rectifies all the charges at the antenna end into DC power for powering the load circuit. In this way, the function of continuously adjust the limited voltage is achieved, so that the limited voltage value has continuity and accuracy, and the stability of the operating voltage value of the circuits is guaranteed.

8 Claims, 5 Drawing Sheets

(58) Field of Classification Search
USPC .......................................... 235/492, 487, 380
See application file for complete search history.

LIMITER CIRCUIT CAPABLE OF CONTINUOUSLY ADJUSTING AMPLITUDE OF RECTIFIED SIGNAL AND PASSIVE RADIO FREQUENCY TAG

CROSS-REFERENCE TO RELATED APPLICATIONS

This application is a continuation of International Patent Application No. PCT/CN2015/070140 with a filing date of Jan. 6, 2015, designating the United States, and further claims priority to Chinese Patent Application No. 201410008854.4 with a filing date of Jan. 8, 2014. The content of the aforementioned applications, including any intervening amendments thereto, are incorporated herein by reference.

TECHNICAL FIELD

The present invention belongs to the technical field of radio frequency identification, and particularly relates to a limiter circuit capable of continuously adjusting amplitude of a rectified signal and a passive radio frequency tag containing the limiter circuit.

BACKGROUND OF THE PRESENT INVENTION

Passive radio frequency identification (RFID) tags, as they themselves are not designed with any battery, operate relying on electromagnetic energy sent from a card reader. Due to their simple structure and economical practicality, passive RFID tags have been widely applied in the fields of logistics management, asset tracking and mobile healthcare.

When a passive RFID tag operates, it will absorb electromagnetic energy, sent from a card reader, from the surrounding. After absorbing the energy, the passive RFID tag rectifies part of the energy into DC power for powering internal circuits of the passive RFID tag; and the passive RFID tag further inputs the other part of the energy to an internal modulation/demodulation circuit which will demodulate an amplitude modulation signal carried in this energy and send the demodulated signal to a digital baseband portion of the passive RFID tag for processing.

As the distance between the passive RFID tag and the card reader varies, the electromagnetic energy absorbed by the passive RFID tag during operating from the surrounding varies too. When the passive RFID tag is too close to the card reader or the electromagnetic energy sent from the card reader is too high, the strength of a signal received by the passive RFID tag will also be high, so that the voltage sensed on the coil exceeds the voltage-withstanding limit of a transistor for the rectifier module in the chip. As a result, the transistor is damaged permanently, and the RFID tag no longer functions.

The passive RFID tag transmits data to the card reader in a load modulation manner, and the coil at the card reader side acquires the data upon detecting change in the impedance of the coil at the RFID tag side. When the passive RFID tag is too close to the card reader or the electromagnetic energy sent from the card reader is too high, a load modulation signal coupled from the RFID tag side is likely to result in saturation of the receiving end of the card reader, thus to fail the communication. Such failure is more likely to occur in an RTF (Reader Talk First) communication mode where the card reader sends a command first and then waits for a response from the RFID tag.

In order to solve the aforementioned problems of voltage-withstanding reliability and reception saturation of the card reader, it is required to provide an amplitude limitation processing circuit in the interior of an RFID tag chip circuit, in order to ensure that the voltage across both ends of an antenna on the RFID tag is limited to a predetermined value.

In the Invention Patent Application No. 201010568305.4, filed on Nov. 30, 2010 by the University of Electronic Science and Technology and entitled Demodulator Circuit for Ultrahigh-frequency Radio Frequency Identification Tap Chip, the amplitude limiting function is realized by a voltage comparator. The voltage comparator compares a magnitude relationship between envelope signals (i.e., data information) generated by an envelope detection circuit and a mean value of the envelop signals themselves, so that an inverter following the voltage comparator outputs high or low logic signals, i.e., demodulated signals. As such, even in the case where the signal intensity difference is very large due to a too small distance or a too large distance from a card reader to an electronic tag, the demodulator circuit is still able to self-adaptively ensure the stability of a mean value generation circuit, so as to ensure the normal and stable operation of the demodulator circuit.

The technology of self-adaptively adjusting voltage at the gate of a first PMOS transistor in the above patent is a method for indirectly monitoring the intensity of radio frequency signals. The object of the dynamic adjustment is a PMOS transistor serving as an equivalent resistor, so that the equivalent resistance of the channels of the PMOS transistor under different signal intensities remains stable, that is, the time constant of the filter formed together with a capacitor remains stable, thereby finally realizing stable detection effects and ensuring the normal and stable operation of the demodulator circuit. In the present application, the intensity of radio frequency signals is monitored by the dynamic adjustment of the voltage amplitude of the rectifier, and the object of adjustment is a limiter circuit of the rectifier, so that a current leakage path from an antenna port to the ground is opened to different degrees under different signal intensities, thereby protecting transistors at the radio frequency front-end from being influenced by a high voltage and avoiding saturation of reception at the card reader side.

The PCT Patent Application No. 200880129721.5, filed on Jun. 9, 2008 by Shimadzu Corporation and entitled Limiter Circuit, disclosed a limiter circuit for cutting off voltage values exceeding upper and lower threshold signals by switching on or off transistors. This limiter circuit is used for limiting the signal intensity and is specific to circuits having a constant power input. This limiter circuit is different from the rectifier control circuit used in the present application, and also unable to be applied in an RFID circuit.

In the Invention Patent Application No. 200710058875.7, filed on Aug. 20, 2007 by Tianjin Nandaqiangxin Semiconductor Chip Design Co., LTD. and entitled Radio Frequency Identification Tag Circuit System Structure and Operating Methods and Applications thereof, the unique inventive point is that a power supply line from a rectifier is divided into several paths for different modules, and a viewpoint of improving energy conversion and utilization efficiency is thus provided. First, dividing a power supply line into several paths to be connected to different modules is a common practice in the chip design, and this application fails to clearly explain how to improve the energy conversion and utilization efficiency and what extent the energy conversion and utilization efficiency are improved. If it is desirable to really realize efficiency improvement, the connection method mentioned in this application (it itself is a common connection method) is not enough, and directly supplying power to a high voltage generation circuit of a storage control module by a rectifier output branch will even result in very high power consumption of an oscillator used in a charge pump. Second, this application does not involve the aspect of dynamically adjusting the voltage amplitude at the input terminal of a rectifier in the present patent application, and thus is not overlapped with the inventive point of the present patent application.

In the Invention Patent No. 200610024814.4, filed by Shanghai Huahong Integrated Circuit Co., LTD. and entitled Limiter and Protector Circuit for Non-contact IC card and Radio Frequency Tag Chip, the following concept was proposed: a limiter circuit with the purpose of improving performance of the radio frequency tag chip, performance such as voltage stabilization, clock, demodulation and reset circuit; and this limiter circuit aims to protect over-voltage drive resulting from a strong field sensed instantly, and solve the problem of saturation of reception at a card reader side. The differences between this patent and the present application are as follows.

1. Due to different purposes of the limiter circuits, the limiter circuit provided by Shanghai Honghua generates amplitude limiting signals by controlling the charging or discharging of a capacitor by a high-voltage or low-voltage detection circuit. The change in specific field intensity of the amplitude limiting signals has an obviously large time constant, that is, the change in voltage amplitude on the antenna is slowly reflected. This technology cannot achieve the purpose of over-voltage protection as provided in the present application because the transistors inside the radio frequency tag chip have been in an unreliable over-voltage driven state within the limited time constant. Therefore, the limiter circuit disclosed by the present application has a very quick response speed to the change in voltage on the antenna and thus may provide for good protection.

2. The limiter circuit provided by Shanghai Honghua has two discharge paths. One discharge path is a slow path, as described above, which is not suitable to over-voltage protection, while the other one is a discharge path controlled by demodulation signals. This technology is substantially different from the technology disclosed by the present application.

3. The switching transistor controlled by high-voltage detection and low-detection signals in Shanghai Honghua Patent has two constant current sources as bias. This will result in large DC power consumption in a passive radio frequency tag system and is disadvantageous for the realization of low power consumption and high sensitivity.

4. The limiter circuit provided by Shanghai Honghua has two judgment points, i.e., a critical point for a too low voltage and a critical point for a too high voltage, for detecting the voltage across two ends of an antenna. When the voltage across two ends of the antenna is lower than the critical point for a too low voltage, the charge on a capacitor is discharged. When the voltage across two ends of the antenna is higher than the critical point for a too high voltage, the charge on a capacitor is charged and accumulated. The problem is that two control switches, i.e., an upper control switch and a lower control switch, are both in an OFF state when the voltage across two ends of the antenna is between the two critical points, and the voltage on the capacitor is floating and independent of control by any signal. This is a fatal problem in a passive radio frequency tag chip, and is likely to result in uncontrollable current discharge and thus energy loss, thereby affecting the sensitivity of the tag. This is not a problem in the technology disclosed in the present application. In the present application, only one decision point is defined to control the ON and OFF of the switch. Once the switch is turned on, the modulation can be continuously adjusted.

SUMMARY OF PRESENT INVENTION

The problem to be solved by the embodiments of the present invention is to provide a limiter circuit capable of continuously adjusting amplitude of a rectified signal and a passive radio frequency tag containing the limiter circuit. The amplitude limiting control of the circuit voltage is realized by dynamically adjusting the voltage amplitude of a rectifier, and the saturation of reception at the card reader side is avoided.

To achieve the above objective, the present invention employs the following technical solutions.

A limiter circuit capable of continuously adjusting amplitude of a rectified signal is provided, including:

a resonant capacitor, which is connected, between a first antenna terminal and a second antenna terminal, in parallel to a resonant inductor, and configured to form a resonant circuit together with the resonant inductor, and receive an external electromagnetic field and couple the external electromagnetic field to a rectifier circuit;

a rectifier circuit, an input terminal of which is connected to the first antenna terminal and the second antenna terminal, and configured to convert AC power, to which the resonant circuit is coupled, into DC power and output the DC power to an external load circuit, and provide power supply to the rectifier circuit; and meanwhile, one output terminal of which is grounded and configured to output charge to the ground when the field intensity is too high; and a limiter circuit, the power input terminal of which is connected to a power output terminal of the rectifier circuit, and the output terminal of which is connected to a control input terminal of the rectifier circuit;

wherein the limiter circuit includes a current mirror unit connected to a power supply; a control terminal of the current mirror unit is connected to an input terminal of a threshold unit; the control terminal of the threshold unit is connected to a band-gap reference voltage module unit; and an output terminal of the threshold unit is grounded.

Another objective of the embodiments of the present invention is to provide a passive radio frequency tag containing the limiter circuit capable of continuously adjusting amplitude of a rectified signal as described above.

In the present invention, by connecting a band-gap reference voltage module unit to a threshold unit of a limiter circuit, the ON-voltage of the threshold unit can be dynamically and continuously controlled; and the output voltage value of the band-gap reference voltage module unit can be arbitrarily set as needed for operating the circuit. When a voltage of the antenna terminal is higher than the sum of this band-gap reference voltage value and the respective threshold voltage of the serial MOS transistors, the threshold unit is turned ON to switch on a grounded path, so that charge at the antenna is output to the ground; in this way, the amount of charge at the antenna terminal is reduced and the rectified DC voltage is thus reduced. When the voltage at the antenna terminal is lower than the sum of this band-gap reference voltage value and the respective threshold voltage of the serial MOS transistors, the threshold unit is turned off to switch off the grounded path. The rectifier circuit rectifies all the charges at the antenna end into DC power for powering the load circuit. In this way, the function of continuously adjust the limited voltage is achieved, and the discontinuous discrete lattice-point conduction resulted from the threshold properties of one-way conductive electronic devices is avoided, so that the limited voltage value has continuity and accuracy, and the stability of the operating voltage value of the circuits is guaranteed.

DESCRIPTION OF THE DRAWINGS

To make the technical solutions in the embodiments of the present invention or in the prior art more clearly, the accompanying drawings to be used for describing the embodiments will be briefly introduced below. Apparently, the drawings to be described below merely show some embodiments of the present invention, and those of ordinary skill in the art may obtain other drawings according to these drawings without paying any creative effort.

DETAILED DESCRIPTION OF PREFERRED EMBODIMENTS

The technical solutions in the embodiments of the present invention will be described clearly and completely with reference to the accompanying drawings in the embodiments of the present invention. Apparently, the embodiments to be described are merely some but not all embodiments of the present invention. Based on the embodiments of the present invention, all other embodiments obtained by those of ordinary skill in the art without paying any creative effort shall fall into the protection scope of the present invention.

Before the embodiments of the present invention are described, some key words involved in the embodiments of the present invention are to be explained. The term "connected" in the embodiments of the present invention represents a direct or indirect connection relationship between two connecting end points.

Figure 1:
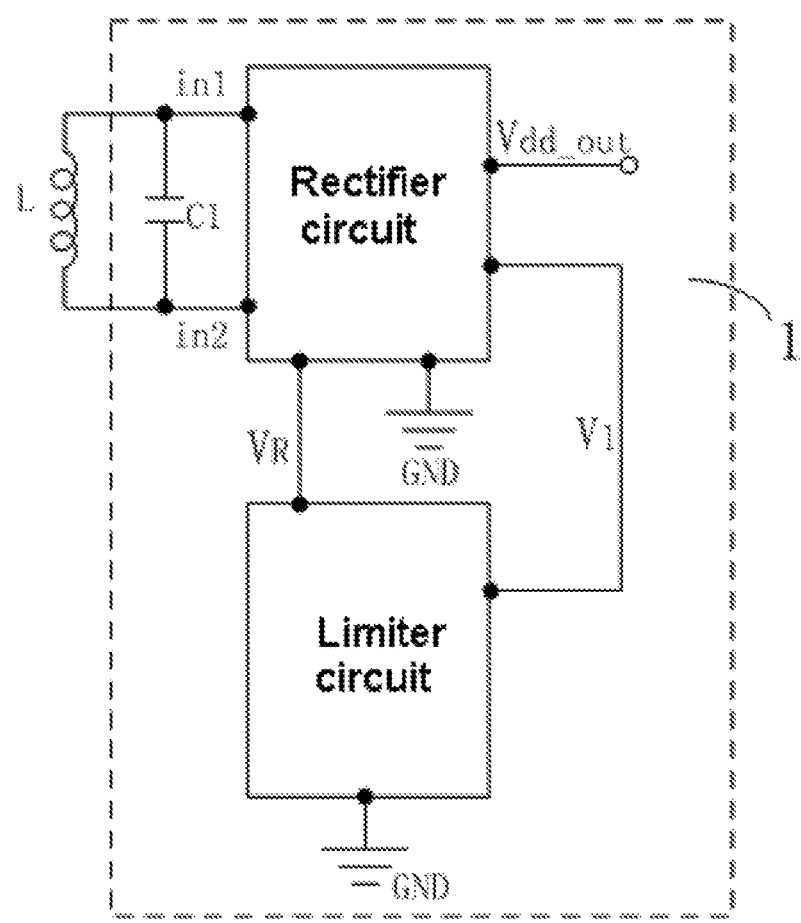
FIG. 1 is a general structure block diagram of a circuit according to the present invention.

FIG. 1 is a general structure block diagram of a circuit according to the present invention. A limiter circuit 1 capable of continuously adjusting amplitude of a rectified signal of the present invention includes:

a resonant capacitor C1, which is connected, between a first antenna terminal in1 and a second antenna terminal in2, in parallel to a resonant inductor L, and configured to form a resonant circuit together with the resonant inductor L, and receive an external electromagnetic field and couple the external electromagnetic field to a rectifier circuit;

a rectifier circuit 2, an input terminal of which is connected to the first antenna terminal in1 and the second antenna terminal in2, and configured to convert AC power, to which the resonant circuit is coupled, into DC power and output the DC power to an external load circuit, and provide power supply to the rectifier circuit; and meanwhile, one output terminal of which is grounded and configured to output charge to the ground when the field intensity is too high; and a limiter circuit 3, the power input terminal of which is connected to a power output terminal $V_1$ of the rectifier circuit, and the output terminal $V_R$ of which is connected to a control input terminal of the rectifier circuit;

wherein the limiter circuit 3 includes a current mirror unit connected to a power supply; a control terminal of the current mirror unit is connected to an input terminal of a threshold unit 4; a control terminal of the threshold unit is connected to a band-gap reference voltage module unit 5; and an output terminal of the threshold unit is grounded.

Figure 2:
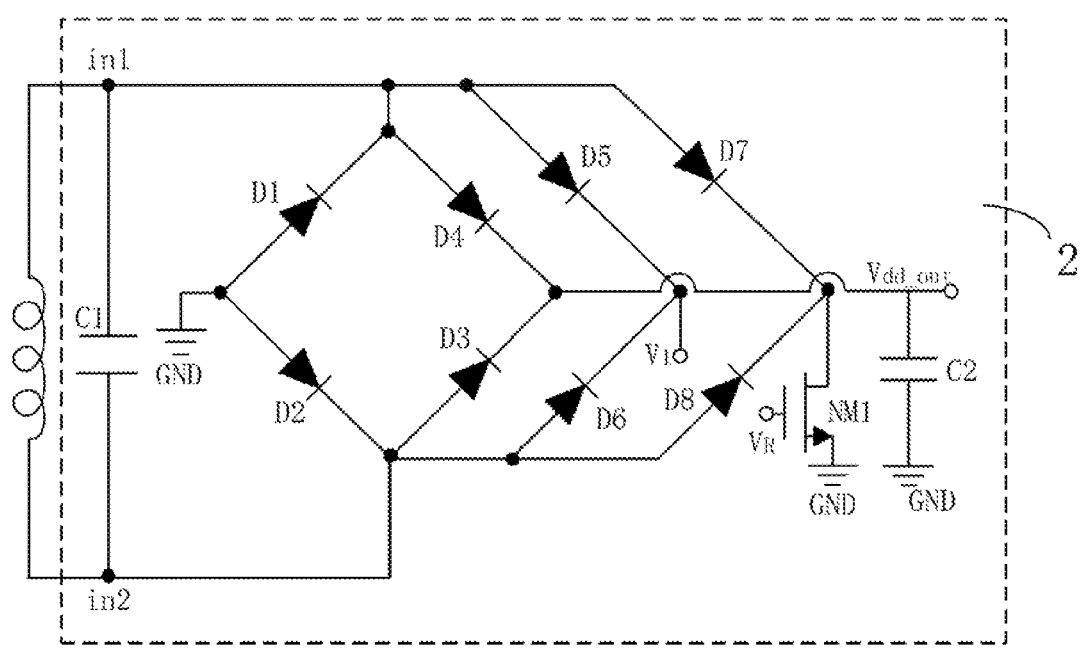
FIG. 2 is a structure diagram of Embodiment 1 of a rectifier circuit according to the present invention.

FIG. 2 is a structure diagram of Embodiment 1 of a rectifier circuit according to the present invention. The rectifier circuit 2 includes a first rectifier branch, a second rectifier branch and a third rectifier branch, which are connected in parallel between the first antenna terminal in1 and the second antenna terminal in2.

The first rectifier branch is a bridge rectifier circuit, one output terminal of which is grounded and the other output terminal $V_{dd\text{-}out}$ of which is connected to an external load circuit, and configured to convert AC power, to which the resonant circuit is coupled, into DC power for powering the external load circuit.

The second rectifier branch is a fifth diode D5 and a sixth diode D6 connected between the first antenna terminal in1 and the second antenna terminal in2. As shown in FIG. 2, the fifth diode D5 and the sixth diode D6 are configured to convert AC power, to which the resonant circuit is coupled, into DC power $V_1$ and output the DC power $V_1$ to the input terminal of the limiter circuit for powering the limiter circuit.

Figure 3:
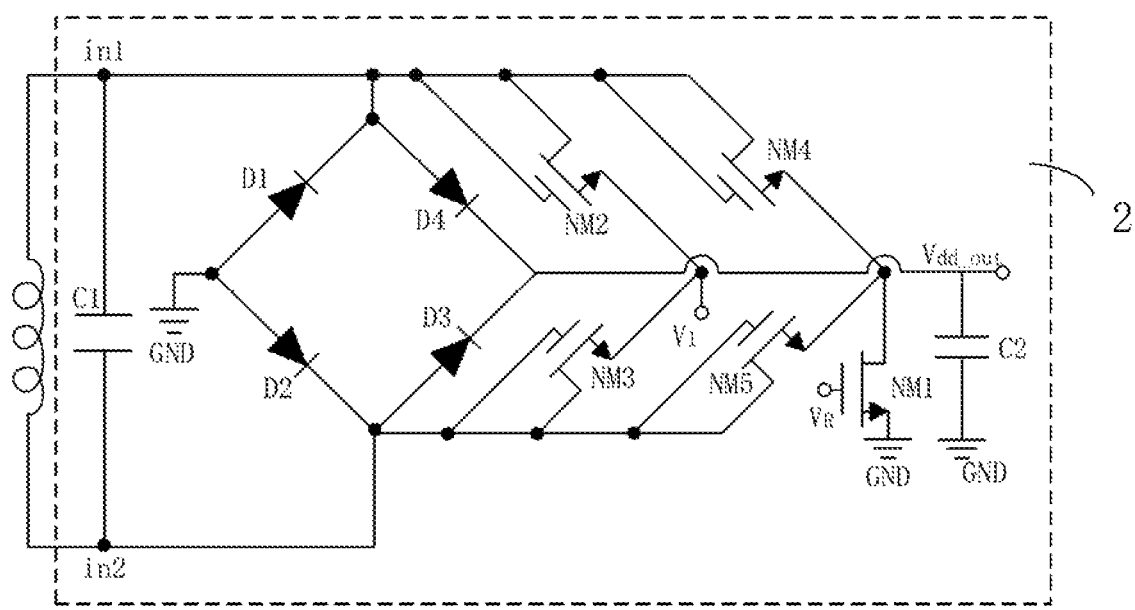
FIG. 3 is a structure diagram of Embodiment 2 of the rectifier circuit according to the present invention.

The structure of a second embodiment of the second rectifier branch is as shown in FIG. 3. In this embodiment, the second rectifier branch is a second N-type MOS transistor NM2 and a third N-type MOS transistor NM3 connected between the first antenna terminal in1 and the second antenna terminal in2; a gate and a drain of the second N-type MOS transistor NM2 are respectively connected to the first antenna terminal in1; a gate and a drain of the third N-type MOS transistor NM3 are respectively connected to the second antenna terminal in2; and a source of the second N-type MOS transistor NM2 is connected to a source of the third N-type MOS transistor NM3 and configured to convert AC power, to which the resonant circuit is coupled, into the DC power $V_1$ and output the DC power $V_1$ to the input terminal of the limiter circuit for powering the limiter circuit.

The fifth diode D5 and the second N-type MOS transistor NM2, as well as the sixth diode D6 and the third N-type MPS transistor NM3, are all one-way conductive electronic elements and configured to rectify AC power between the first antenna terminal in1 and the second antenna terminal in2 into DC power $V_1$. The voltage value of $V_1$ is obtained by subtracting $V_{in1}$ (the AC signal of a positive half cycle) or $V_{in2}$ (the AC signal of a negative half cycle) by the threshold voltage of the diode or MOS transistor.

The third rectifier branch is a seventh diode D7 and an eighth diode D8 connected between the first antenna terminal in1 and the second antenna terminal in2, as shown in FIG. 2. The cathode terminals of the seventh diode D7 and the eighth diode D8 are connected to the drain of the first N-type MOS transistors. A gate of the first N-type MOS transistors NM1 is connected to the output terminal $V_R$ of the limiter circuit, and the source thereof is grounded and configured to output charge to the ground when the field intensity is too high, so as to reduce the amount of charge between the first antenna terminal in1 and the second antenna terminal in2.

The structure of a second embodiment of the third rectifier branch is as shown in FIG. 3. In this embodiment, the third rectifier branch is a fourth N-type MOS transistor NM4 and a fifth N-type MOS transistor NM5 connected between the first antenna terminal in1 and the second antenna terminal in2. A gate and a drain of the fourth N-type MOS transistor NM4 are respectively connected to the first antenna terminal in1, and a gate and a drain of the fifth N-type MOS transistor NM5 are respectively connected to the second antenna terminal in2. A source of the fourth N-type MOS transistor NM4 is connected to a source of the fifth N-type MOS transistor NM5 and to the drain of the first N-type MOS transistor NM1. A gate of the first N-type MOS transistors NM1 is connected to the output terminal $V_R$ of the limiter circuit, and a source thereof is grounded and configured to output charge to the ground when the field intensity is too high, so as to reduce the amount of charge between the first antenna terminal in1 and the second antenna terminal in2.

The seventh diode D7 and the fourth N-type MOS transistor NM4, as well as the eighth diode D8 and the fifth N-type MOS transistor NM5, are all one-way conductive electronic elements and configured to rectify AC power between the first antenna terminal in1 and the second antenna terminal in2 into DC power and output the DC power to the first N-type MOS transistor NM1.

The one-way conductive electronic elements playing a rectification role in the first rectifier branch, the second rectifier branch and the third rectifier branch can all be a combination of any form of diodes or MOS transistors, including, but not limited to, two combinations shown in the drawings; and the amplification proportion of diodes or MOS transistors can be set by adjusting the size (i.e., area of a PN junction) of the diodes or the channel size proportion of the MOS transistors, so as to realize the purpose of reducing power consumption.

Figure 4:
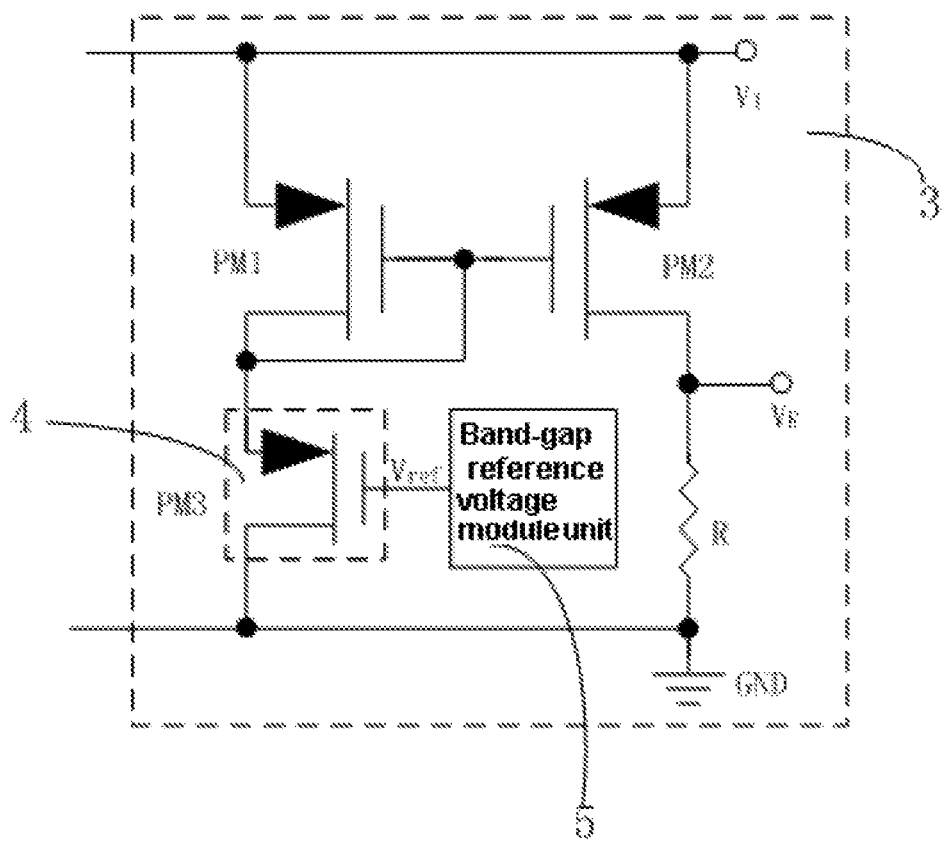
FIG. 4 is a structure diagram of Embodiment 1 of a limiter circuit according to the present invention.

FIG. 4 shows a structure diagram of a limiter circuit 3 according to the present invention. The limiter circuit includes a current mirror unit connected to a power supply; a control terminal of the current mirror unit is connected to an input terminal of a threshold unit 4; the control terminal of the threshold unit 4 is connected to a band-gap reference voltage module unit 5; and an output terminal of the threshold unit is grounded.

The current mirror unit includes a first P-type MOS transistor PM1 and a second P-type MOS transistor PM2; sources of the first P-type MOS transistor PM1 and the second P-type MOS transistor PM2 are respectively connected to a power supply $V_1$ to serve as a current source; a gate of the first P-type MOS transistor PM1 is connected to a gate of the second P-type MOS transistor PM2; and the gate of the first P-type MOS transistor is connected to the drain thereof and to the threshold unit 4; a control terminal of the threshold unit 4 is connected to the band-gap reference voltage module unit 5, and the output terminal thereof is grounded. A drain of the second P-type MOS transistor PM1 is connected to the gate of the first N-type MOS transistor NM1, and the drain is grounded by a resistor R.

The threshold unit 4 is configured to form a one-way conductive branch together with the first P-type MOS transistor PM1. Thus, the threshold unit can be one or more MOS transistors connected in serial between a drain terminal of the first P-type MOS transistor PM1 and the ground, or can be one or more diodes connected in serial between the drain terminal of the first P-type MOS transistor PM1 and the ground. Thus, the ON-voltage of the limiter circuit is the sum of threshold voltages of the one-way conductive electronic devices in this branch.

However, due to the threshold properties of an electronic device, when the voltage value is lower than the threshold voltage, this electronic device remains in the OFF state. When the voltage value equals to or is higher than 0.7 V (assuming the threshold voltage of all the diodes and MOS transistors is 0.7V), the electronic device is turned on. The limiter circuit is turned on to start leakage, i.e., the ON-voltage of the limiter circuit is N times of 0.7 V, N being the sum of the number of the first P-type MOS transistor PM1 and the number of diodes and/or MOS transistors connected in serial to the drain terminal thereof, N being higher than or equal to 2. Thus, the ON-voltage of the limiter circuit shows a discontinuous discrete lattice-point pattern. In this way, a dead zone of amplitude limiting voltage value definitely exists. For example, when the amplitude limiting voltage value is to be set between 0.7 V and 1.4 V, a limiter circuit in which a threshold unit is formed by directly connecting diodes or MOS transistors in series cannot be achieved.

The band-gap reference voltage module unit indispensably exists in a radio frequency identification tag. The voltage value generated by the band-gap reference voltage module unit, being compensated by temperature and process fluctuation, has a relatively high accuracy; furthermore, the circuit input thereof is highly adjustable. The output voltage of the band-gap reference output voltage can be selected by setting a switch of the output circuit. Thus, the band-gap reference voltage $V_{ref}$ is not restricted by the node, and can be set as any voltage value as needed.

Therefore, a first embodiment of the limiter circuit according to the embodiments of the present invention is as follows: as the threshold unit, a third P-type MOS transistor PM3 is used; and a source of the third P-type MOS transistor PM3 is connected to a drain terminal of a first P-type MOS transistor PM1, a gate thereof is connected to a band-gap reference voltage module unit 5, and a drain thereof is grounded, as shown in FIG. 4.

The technical solutions disclosed in the present application can be expressed as follows: a rectifier of a radio frequency identification tag converts electromagnetic energy of the surrounding into DC voltage $V_{dd-out}$; after the voltage rises from a zero potential to a certain extent which is enough for the band-gap reference voltage module unit to operate, a band-gap reference voltage generation circuit generates, by a self-starting process, a relatively accurate band-gap reference voltage $V_{ref}$ which is used to control the gate of the third P-type MOS transistor PM3 of the threshold unit in the limiter circuit.

Meanwhile, the rectifier of the radio frequency tag converts the electromagnetic energy of the surrounding into DC voltage $V_1$. The voltage $V_1$ is input to the limiter circuit and loaded onto the first P-type MOS transistor PM1 and the third P-type MOS transistor PM3. When V1 rises to a certain extent, the first P-type MOS transistor PM1 and the P-type MOS transistor PM3 enter a current bias state, that is, there is AC current flowing through the channels of the first P-type MOS transistor PM1 and the third P-type MOS transistor PM3. According to the intrinsic properties of the P-type MOS devices, in the current bias state, there is a difference in threshold voltage ($V_{th}$), i.e., the source voltage $V1=V_{th(PM1)}+V_{ref}+V_{th(PM3)}$, between the source and the gate of a P-type MOS transistor.

As one embodiment, the band-gap reference voltage $V_{ref}$ is set as 0.9 V. By controlling the gate of the third p-type MOS transistor PM3, the source of the P-type MOS transistor is set as 1.6 V (i.e., 0.9 V+0.7 V). As the first P-type MOS transistor PM1 connected thereto is added with an additional threshold voltage of 0.7 V, the amplitude limiting voltage of the limiter circuit is set as 2.3 V. In consideration of process fluctuation which has not been completely removed, the amplitude limiting voltage is set between 1.9 V and 2.7 V. This is a very suitable amplitude limiting voltage, because the voltage not only realizes the design purpose of reducing power consumption (i.e., the chip can operate with extremely low field intensity), and also enables quite reliable operation of a device of 3.3 V. When the value of $V_1$ is lower than the amplitude limiting voltage, the first P-type MOS transistor PM1 and the threshold unit is not turned on; when current output by the drain of the second P-type MOS transistor PM2 is zero, $V_R$ is zero; and when the first N-type MOS transistor NM1 is not turned on, the amount of charge between the first antenna terminal and the second antenna terminal is not influenced. If the value of $V_1$ is higher than the amplitude limiting voltage, the first P-type MOS transistor and the threshold unit branch are turned on; the first P-type MOS transistor PM1 mirrors the current to the second P-type MOS transistor PM2 and generates a voltage difference, by the resistor R, which is input to the gate of the first N-type MOS transistor NM1; and the first N-type MOS transistor is turned on, and the charge between the first antenna terminal and the second antenna terminal is output to the ground by the source thereof, so that the amount of charge between the first antenna terminal and the second antenna terminal is reduced. In this way, the DC power $V_{dd\text{-}out}$ rectified by the bridge rectifier circuit is reduced, that is, the voltage across the two ends of the load circuit is reduced. If the charge between the first antenna terminal and the second antenna terminal is always higher than the amplitude limiting voltage, the leakage path is always ON to constantly reduce the amount of charge. The leakage path is turned off until the amount of charge is below the amplitude limiting voltage value. In this way, a dynamic rectification control is imposed on the circuit voltage continuously and circularly to prevent the load circuit from being broken down by a too high voltage.

Figure 5:
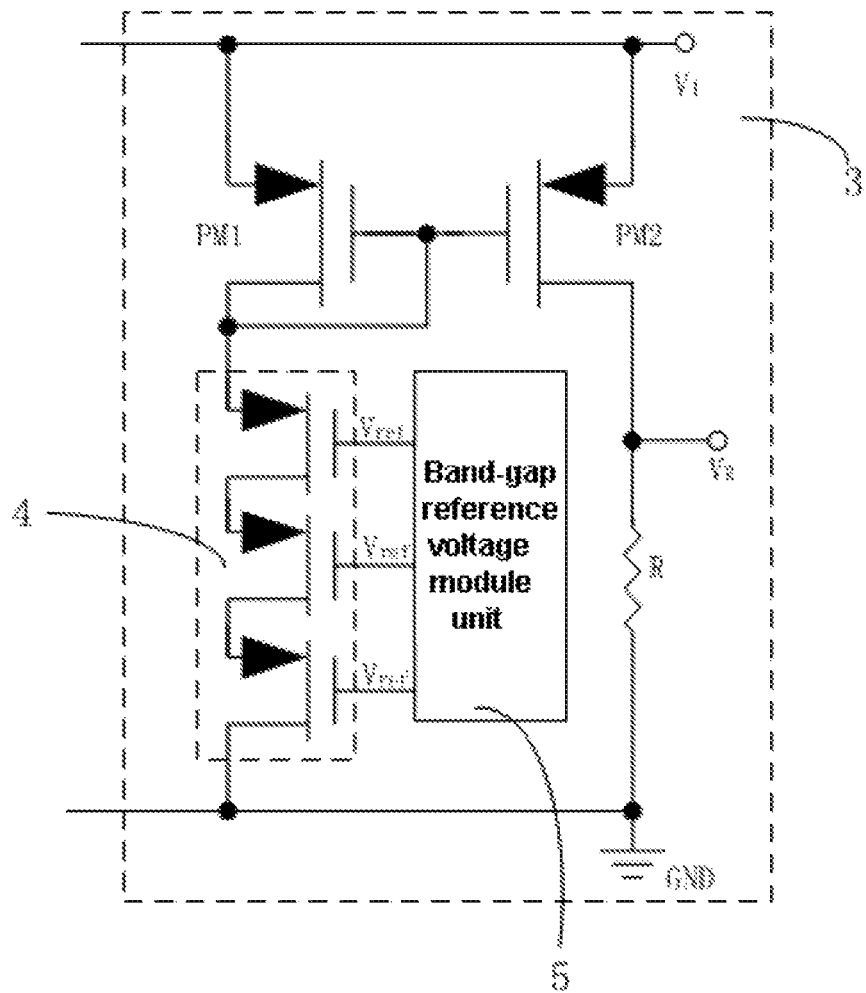
FIG. 5 is a structure diagram of Embodiment 2 of the limiter circuit according to the present invention.

When the threshold unit 4 in the embodiment of the present invention includes a plurality of P-type MOS transistors, the P-type MOS transistors are connected to each other in the following way: a drain terminal of any one P-type MOS transistor is connected to a source terminal of an adjacent P-type MOS transistor to form a serial structure; a source of the first P-type MOS transistor is connected to a drain of the first P-type MOS transistor PM1 to serve as an input terminal of the threshold unit 4, and a drain of the last P-type MOS transistor is grounded to serve as an output terminal of the threshold unit 4; and the gates of the P-type MOS transistors are all connected to the band-gap reference voltage module unit 5, as shown in FIG. 5. With the use of a plurality of P-type MOS transistors connected, the overall effective resistance of the threshold unit can be increased, and the branch current is further restricted so as to realize the design purpose of reducing the power consumption.

In the present invention, the continuous amplitude limiting control performed on the limiter circuit by a band-gap reference voltage plays a crucial role in the system design of a radio frequency identification tag. First, due to the continuity of the band-gap reference voltage, the amplitude limiting voltage can become continuous, and the amplitude limiting voltage value can be defined to be slightly higher than the voltage value of the operating point according to the operating need of the circuit, so that the operating stability of the circuit is guaranteed. Second, due to the accuracy of the band-gap reference voltage, the selection range of electronic devices can be greatly narrowed, thus imposing great influence on meeting the design requirement on low cost. Specifically, for low-frequency (125 KHz) radio frequency identification tags without an accurate amplitude limiting or even without any amplitude limiting, a voltage input or output by the rectifier will change from 1-2 V to 14-15 V. However, common MOS devices of 3.3 V or MOS devices of 5 V are unable to operate at such a voltage. As a result, the selection of a chip manufacturing process must be restricted to a semiconductor process which provides large-size high-pressure-resistant devices. As a result, the cost is inevitably increased, and this is disadvantageous to meet the design requirement on low cost.

Another objective of the embodiments of the present invention is to provide a passive radio frequency tag containing the limiter circuit capable of continuously adjusting amplitude of a rectified signal as described above. With regard to the passive radio frequency identification tag, by connecting a band-gap reference voltage module unit to a threshold unit of a limiter circuit, the ON-voltage of the threshold unit can be dynamically and continuously controlled; and the output voltage value of the band-gap reference voltage module unit can be arbitrarily set as needed for operating the circuit. When a voltage of the antenna terminal is higher than the sum of this band-gap reference voltage value and the respective threshold voltage of the serial MOS transistors, the threshold unit is turned ON to switch on a grounded path, so that charge at the antenna is output to the ground; in this way, the amount of charge at the antenna terminal is reduced and the rectified DC voltage is thus reduced. When the voltage at the antenna terminal is lower than the sum of this band-gap reference voltage value and the respective threshold voltage of the serial MOS transistors, the threshold unit is turned off to switch off the grounded path. The rectifier circuit rectifies all the charges at the antenna end into DC power for powering the load circuit. In this way, the function of continuously adjust the limited voltage is achieved, and the discontinuous discrete lattice-point conduction resulted from the threshold properties of one-way conductive electronic devices is avoided, so that the limited voltage value has continuity and accuracy, and the stability of the operating voltage value of the circuits is guaranteed.

We claim:

1. A limiter circuit capable of continuously adjusting amplitude of a rectified signal, comprising:
    a resonant capacitor, which is connected, between a first antenna terminal and a second antenna terminal, in parallel to a resonant inductor, and configured to form a resonant circuit together with the resonant inductor, and receive an external electromagnetic field and couple the external electromagnetic field to a rectifier circuit;
    a rectifier circuit, an input terminal of which is connected to the first antenna terminal and the second antenna terminal, and configured to convert AC power, to which the resonant circuit is coupled, into DC power and output the DC power to an external load circuit, and provide power supply to the rectifier circuit; and meanwhile, one output terminal of which is grounded and configured to output charge to the ground when the field intensity is too high; and
    a limiter circuit, the power input terminal of which is connected to a power output terminal of the rectifier circuit, and the output terminal of which is connected to a control input terminal of the rectifier circuit;
    wherein the limiter circuit comprises a current mirror unit connected to a power supply; a control terminal of the current mirror unit is connected to an input terminal of a threshold unit; the control terminal of the threshold unit is connected to a band-gap reference voltage module unit; and an output terminal of the threshold unit is grounded;

the current mirror unit comprises a first P-type MOS transistor and a second P-type MOS transistor; sources of the first P-type MOS transistor and the second P-type MOS transistor are respectively connected to the power supply to serve as a current source; a gate of the first P-type MOS transistor is connected to a gate of the second P-type MOS transistor; the gate of the first P-type MOS transistor is connected to the drain thereof and to the threshold unit; and a control terminal of the threshold unit is connected to the band-gap reference voltage module unit, and the output terminal of the threshold unit is grounded; and a drain of the second P-type MOS transistor is connected to the gate of the first N-type MOS transistor, and grounded by a resistor.

2. The limiter circuit capable of continuously adjusting amplitude of a rectified signal according to claim 1, characterized in that the rectifier circuit comprises a first rectifier branch, a second rectifier branch and a third rectifier branch, which are connected in parallel between the first antenna terminal and the second antenna terminal.

3. The limiter circuit capable of continuously adjusting amplitude of a rectified signal according to claim 2, characterized in that the second rectifier branch is a fifth diode and a sixth diode connected between the first antenna terminal and the second antenna terminal; and cathode terminals of the fifth diode and the sixth diode are connected to the input terminal of the limiter circuit for powering the limiter circuit.

4. The limiter circuit capable of continuously adjusting amplitude of a rectified signal according to claim 2, characterized in that the second rectifier branch is a second N-type MOS transistor and a third N-type MOS transistor connected between the first antenna terminal and the second antenna terminal; a gate and a drain of the second N-type MOS transistor are respectively connected to the first antenna terminal; a gate and a drain of the third N-type MOS transistor are respectively connected to the second antenna terminal; and a source of the second N-type MOS transistor is connected to a source of the third N-type MOS transistor and output to the input terminal of the limiter circuit for powering the limiter circuit.

5. The limiter circuit capable of continuously adjusting amplitude of a rectified signal according to claim 2, characterized in that the third rectifier branch is a seventh diode and an eighth diode connected between the first antenna terminal and the second antenna terminal; cathode terminals of the seventh diode and the eighth diode are connected to the drain of the first N-type MOS transistor; and the gate of the first N-type MOS transistor is connected to the input terminal of the limiter circuit, and the source thereof is grounded and configured to output charge to the ground when the field intensity is too high.

6. The limiter circuit capable of continuously adjusting amplitude of a rectified signal according to claim 2, characterized in that the third rectifier branch is a fourth N-type MOS transistor and a fifth N-type MOS transistor connected between the first antenna terminal and the second antenna terminal; a gate and a drain of the fourth N-type MOS transistor are respectively connected to the first antenna terminal; a gate and a drain of the fifth N-type MOS transistor are connected to the second antenna terminal; the source of the fourth N-type MOS transistor is connected to the fifth N-type MOS transistor and to the drain of the first N-type MOS transistor; and the gate of the first N-type MOS transistor is connected to the output terminal of the limiter circuit, and the source thereof is grounded and configured to output charge to the ground when the field intensity is too high.

7. The limiter circuit capable of continuously adjusting amplitude of a rectified signal according to claim 1, characterized in that the threshold unit is at least one P-type MOS transistor; in the at least one P-type MOS transistor, a drain terminal of any one P-type MOS transistor is connected to a source terminal of an adjacent P-type MOS transistor to form a serial structure; the source of the first the P-type MOS transistor is connected to the drain of the first P-type MOS transistor to serve as an input terminal of the threshold unit; the drain of the last P-type MOS transistor is grounded to serve as an output terminal of the threshold unit; and gates of the P-type MOS transistors are all connected to the band-gap reference voltage module unit.

8. A passive radio frequency tag, characterized in that the passive radio frequency tag comprises the limiter circuit capable of continuously adjusting amplitude of a rectified signal according to claim 1.

* * * * *